United States Patent
Ryu et al.

(10) Patent No.: US 9,525,904 B2
(45) Date of Patent: Dec. 20, 2016

(54) DISPLAY APPARATUS, REMOTE CONTROLLER AND METHOD FOR CONTROLLING APPLIED THERETO

(75) Inventors: Young-jun Ryu, Suwon-si (KR); Byung-jin Hwang, Suwon-si (KR); Dong-jin Lee, Suwon-si (KR); Jae-hong Ahn, Yongin-si (KR); Hye-jeong Lee, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 13/278,719

(22) Filed: Oct. 21, 2011

(65) Prior Publication Data
US 2012/0162514 A1 Jun. 28, 2012

(30) Foreign Application Priority Data
Dec. 27, 2010 (KR) .................. 10-2010-0135814

(51) Int. Cl.
- H04N 21/422 (2011.01)
- G06F 1/16 (2006.01)
- G06F 3/0481 (2013.01)
- G06F 3/0488 (2013.01)
- H04N 21/431 (2011.01)

(52) U.S. Cl.
CPC ...... *H04N 21/42204* (2013.01); *G06F 1/1694* (2013.01); *G06F 3/0481* (2013.01); *G06F 3/0488* (2013.01); *G06F 2200/1637* (2013.01); *G06F 2203/04803* (2013.01); *H04N 21/4312* (2013.01)

(58) Field of Classification Search
CPC ...... H04N 5/45; H04N 5/445; H04N 5/44582; H04N 2005/4432

USPC ........ 348/563, 564, 565, 569, 584, 588, 734
See application file for complete search history.

(56) References Cited

U.S. PATENT DOCUMENTS

| | | | | | |
|---|---|---|---|---|---|
| 5,576,769 | A | * | 11/1996 | Lendaro | 348/511 |
| 5,589,893 | A | * | 12/1996 | Gaughan et al. | 725/37 |
| 5,767,919 | A | * | 6/1998 | Lee et al. | 725/37 |
| 5,793,361 | A | * | 8/1998 | Kahn et al. | 345/179 |
| D416,560 | S | * | 11/1999 | Tonino | D14/218 |
| 6,535,198 | B1 | * | 3/2003 | Fan | 345/158 |
| 6,590,618 | B1 | * | 7/2003 | Park et al. | 348/734 |

(Continued)

FOREIGN PATENT DOCUMENTS

| | | | |
|---|---|---|---|
| WO | 2009032998 A1 | 3/2009 | |
| WO | WO 2009/032998 | * 3/2009 | G06F 3/048 |

OTHER PUBLICATIONS

Documents were cited by applicant (Feb. 23, 2016).*
Communication dated Mar. 26, 2012 from the European Patent Office in counterpart European application No. 11184517.8.

Primary Examiner — Brian Yenke
(74) Attorney, Agent, or Firm — Sughrue Mion, PLLC

(57) ABSTRACT

A display apparatus, a remote controller and a method for controlling applied thereto are provided. The display apparatus receives direction information regarding an orientation of the remote controller from the remote controller, and selects an area to be controlled by the remote controller from among a first area and a second area of a screen according to the direction information received from the remote controller. As a result, user is enabled to control different areas on the screen by appropriately moving the remote controller between different orientations.

8 Claims, 14 Drawing Sheets

(56) References Cited

U.S. PATENT DOCUMENTS

| | | | |
|---|---|---|---|
| 6,603,420 B1* | 8/2003 | Lu .................................. | 341/176 |
| 6,614,457 B1* | 9/2003 | Sanada et al. ................. | 715/840 |
| 6,618,039 B1* | 9/2003 | Grant et al. ................... | 345/168 |
| 6,747,635 B2* | 6/2004 | Ossia ............................. | 345/169 |
| 6,761,315 B2* | 7/2004 | Kato et al. ............... | 235/462.45 |
| 6,999,804 B2* | 2/2006 | Engstrom et al. .......... | 455/575.3 |
| 7,030,856 B2* | 4/2006 | Dawson et al. .............. | 345/158 |
| 7,038,662 B2* | 5/2006 | Noguera ........................ | 345/158 |
| 7,383,507 B2* | 6/2008 | Shibamiya et al. .......... | 715/721 |
| 8,072,427 B2* | 12/2011 | Pletikosa et al. .......... | 345/169 |
| 8,089,455 B1* | 1/2012 | Wieder ........................ | 345/156 |
| 8,217,825 B2* | 7/2012 | Kim et al. .................... | 341/176 |
| 8,217,964 B2* | 7/2012 | Laine et al. ................. | 345/659 |
| 8,458,748 B2* | 6/2013 | Thomas et al. ................. | 725/50 |
| 2001/0006382 A1* | 7/2001 | Sevat ........................... | 345/169 |
| 2003/0206394 A1* | 11/2003 | Ossia ........................... | 361/680 |
| 2005/0128353 A1* | 6/2005 | Young et al. ................. | 348/588 |
| 2005/0162569 A1* | 7/2005 | Fairhurst et al. ............ | 348/734 |
| 2006/0114246 A1* | 6/2006 | Young .......................... | 345/204 |
| 2006/0132447 A1* | 6/2006 | Conrad ......................... | 345/168 |
| 2006/0139327 A1* | 6/2006 | Dawson et al. ............. | 345/158 |
| 2006/0197870 A1* | 9/2006 | Habas et al. .................. | 348/565 |
| 2008/0211771 A1* | 9/2008 | Richardson ................... | 345/158 |
| 2009/0002218 A1* | 1/2009 | Rigazio et al. ............... | 341/176 |
| 2009/0066533 A1* | 3/2009 | Park et al. ............... | 340/825.22 |
| 2009/0207184 A1* | 8/2009 | Laine et al. .................. | 345/619 |
| 2009/0256861 A1* | 10/2009 | Sacher et al. ................. | 345/650 |
| 2010/0118195 A1* | 5/2010 | Eom et al. .................... | 348/564 |
| 2010/0169790 A1 | 7/2010 | Vaughan et al. | |
| 2010/0169798 A1* | 7/2010 | Hyndman ............... | A63F 13/12 715/757 |
| 2010/0201618 A1* | 8/2010 | Lorente ........................ | 345/157 |
| 2011/0037609 A1* | 2/2011 | Kim et al. ............... | 340/825.22 |
| 2011/0128228 A1* | 6/2011 | Van der Byl ................. | 345/167 |
| 2011/0260840 A1* | 10/2011 | VanDuyn et al. ......... | 340/12.54 |
| 2011/0304778 A1* | 12/2011 | Roberts et al. ............... | 348/734 |
| 2012/0083911 A1* | 4/2012 | Louboutin et al. ............. | 700/94 |
| 2012/0119873 A1* | 5/2012 | Ramsdell et al. .............. | 340/4.3 |
| 2012/0140117 A1* | 6/2012 | Waites ......................... | 348/563 |
| 2012/0154276 A1* | 6/2012 | Shin et al. .................... | 345/158 |
| 2012/0274663 A1* | 11/2012 | Laine et al. .................. | 345/659 |
| 2013/0038634 A1* | 2/2013 | Yamada et al. ............... | 345/649 |
| 2013/0154811 A1* | 6/2013 | Ferren et al. ................. | 340/12.5 |

* cited by examiner

DISPLAY APPARATUS, REMOTE CONTROLLER AND METHOD FOR CONTROLLING APPLIED THERETO

CROSS-REFERENCE TO RELATED APPLICATIONS

This application claims priority from Korean Patent Application No. 10-2010-0135814, filed on Dec. 27, 2010, in the Korean Intellectual Property Office, the disclosure of which is incorporated herein by reference in its entirety.

BACKGROUND

1. Field

Apparatuses and methods consistent with the disclosure provided herein relate to displaying a menu, and more particularly, to a display apparatus displaying an image at a variety of aspect ratios and a method for displaying a menu applied to the same.

2. Description of the Related Art

Continuous development of technologies has enabled content to be provided through a variety of display devices, and images to be provided with a variety of aspect ratios.

For example, a movie may be provided at an aspect ratio of 21:9, a Digital Versatile Disc (DVD) image may be provided at 16:9, and a television (TV) image may be provided at 4:3. To display images in various aspect ratios, widescreen TVs are available.

As TVs are provided with wide displays, a TV may be enabled to divide the screen according to use. However, it is still difficult to control two or more different screens with one remote controller.

Accordingly, it is necessary to enable control of all the divided areas on the screen with one remote controller to improve user convenience. Therefore, a method is necessary, which can enable users to control divided screens with only one remote controller.

SUMMARY

Exemplary embodiments of the present inventive concept overcome the above disadvantages and other disadvantages not described above. Also, the exemplary embodiments or the present inventive concept is not required to overcome the disadvantages described above, and an exemplary embodiment of the present inventive concept may not overcome any of the problems described above.

According to one exemplary embodiment, a technical objective is to provide a display apparatus which receives direction information of a remote controller from the remote controller and selects an area to be controlled by the remote controller from among a first area and a second area of a screen according to a direction of the remote controller, and a control method implemented for the same.

Another objective is to provide a remote controller which selects an area to be controlled from among a first area and a second area of a display screen according to a direction of the remote controller, and a control method implemented for the same.

In one exemplary embodiment, a display apparatus is provided, which may include a display unit which displays a first image on a first area of a screen, and displays a second image on a second area of the screen, and a control unit which receives direction information of a remote controller from the remote controller, and selects an area to be controlled by the remote controller from among the first and second areas according to a direction of the remote controller.

The controller selects the area to be controlled by the remote controller from among the first and second areas, depending on whether a longer-axis direction of the remote controller is in a perpendicular range to a yz plane or in a horizontal range, and the yz plane corresponds to a plane consisting of z-axis in a direction running from the display apparatus to the remote controller and a y-axis in a direction running from ground to sky.

An aspect ratio is longer in horizontal direction than in perpendicular direction in the first area, and shorter in horizontal direction than in perpendicular direction in the second area, and the controller selects the first area for controlling by the remote controller if a direction of the longer axis of the remote controller is in a perpendicular range to the yz plane, and selects the second area for controlling by the remote controller if the direction of the longer axis of the remote controller is in a horizontal range to the yz plane.

In one exemplary embodiment, a method for controlling a display apparatus using a remote controller, which may include displaying a first image on a first area of a screen, and displaying a second image on a second area of the screen, receiving direction information of the remote controller from the remote controller, and selecting an area for controlling by the remote controller, from among the first and second areas according to a direction of the remote controller.

The selecting may include selecting the area to be controlled by the remote controller from among the first and second areas, depending on whether a longer-axis direction of the remote controller is in a perpendicular range to a yz plane or in a horizontal range, and the yz plane corresponds to a plane consisting of z-axis in a direction running from the display apparatus to the remote controller and a y-axis in a direction running from ground to sky.

Further, an aspect ratio is longer in horizontal direction than in perpendicular direction in the first area, and shorter in horizontal direction than in perpendicular direction in the second area, and the selecting may include selecting the first area for controlling by the remote controller if a direction of the longer axis of the remote controller is in a perpendicular range to the yz plane, and selecting the second area for controlling by the remote controller if the direction of the longer axis of the remote controller is in a horizontal range to the yz plane.

In one exemplary embodiment, a remote controller for controlling a display apparatus, which may include a motion sensor unit which detects a direction of the remote controller, and a controller which selects an area to be controlled from among a first and a second areas of a screen of the display apparatus according to the direction of the remote controller.

The controller selects the area to be controlled from among the first and second areas, depending on whether a longer-axis direction of the remote controller is in a perpendicular range to a yz plane or in a horizontal range, and the yz plane corresponds to a plane consisting of z-axis in a direction running from the display apparatus to the remote controller and a y-axis in a direction running from ground to sky.

An aspect ratio is longer in horizontal direction than in perpendicular direction in the first area, and shorter in horizontal direction than in perpendicular direction in the second area, and the controller selects the first area for controlling by the remote controller if a direction of the longer axis of the remote controller is in a perpendicular range to the yz plane, and selects the second area for controlling by the remote controller if the direction of the longer axis of the remote controller is in a horizontal range to the yz plane.

The remote controller according to an exemplary embodiment may additionally include a display unit which displays a screen to control the display apparatus, wherein the controller displays a first control screen to control the first area on the display unit upon selecting of the first area, and displays a second control screen to control the second area upon selecting of the second area.

Meanwhile, according to an exemplary embodiment, a control method of a remote controller for controlling a display apparatus, is provided, which may include detecting a direction of the remote controller, and selecting an area to be controlled from among a first and a second areas of a screen of the display apparatus according to the direction of the remote controller.

The selecting may include selecting the area to be controlled from among the first and second areas, depending on whether a longer-axis direction of the remote controller is in a perpendicular range to a yz plane or in a horizontal range, and the yz plane corresponds to a plane consisting of z-axis in a direction running from the display apparatus to the remote controller and a y-axis in a direction running from ground to sky.

An aspect ratio is longer in horizontal direction than in perpendicular direction in the first area, and shorter in horizontal direction than in perpendicular direction in the second area, and the selecting may include selecting the first area for controlling by the remote controller if a direction of the longer axis of the remote controller is in a perpendicular range to the yz plane, and selecting the second area for controlling by the remote controller if the direction of the longer axis of the remote controller is in a horizontal range to the yz plane.

The method may additionally include displaying a first control screen to control the first area on the display unit upon selecting of the first area, and displaying a second control screen to control the second area upon selecting of the second area.

In one exemplary embodiment, a display apparatus controlled by a first remote controller and a second remote controller, is provided, which may include a display unit which displays a first image on a first area of a screen, and displays a second image on a second area of the screen, and a control unit which receives direction information from the first and second remote controllers, and selects areas to be controlled by the first and second remote controllers from among the first and second areas.

An aspect ratio is longer in horizontal direction than in perpendicular direction in the first area, and shorter in horizontal direction than in perpendicular direction in the second area, the control unit selects the first area for controlling by the remote controller if a direction of the longer axis of the remote controller is in a perpendicular range to the yz plane, and selects the second area for controlling by the remote controller if the direction of the longer axis of the remote controller is in a horizontal range to the yz plane, and the yz plane corresponds to a plane consisting of z-axis in a direction running from the display apparatus to the remote controller and a y-axis in a direction running from ground to sky.

As explained above, in various exemplary embodiments, since a display apparatus, a remote controller and a control method implemented for the same are provided according to which direction information of the remote controller is received from the remote controller, and an area to be controlled by the remote controller is selected from among a first area and a second area of a screen according to a direction of the remote controller, user is enabled to control different areas on the screen by changing how he or she holds and moves the remote controller.

BRIEF DESCRIPTION OF THE DRAWINGS

The above and/or other aspects of the present inventive concept will be more apparent by describing certain exemplary embodiments of the present inventive concept with reference to the accompanying drawings, in which.

DETAILED DESCRIPTION OF EXEMPLARY EMBODIMENTS

Figure 1A:
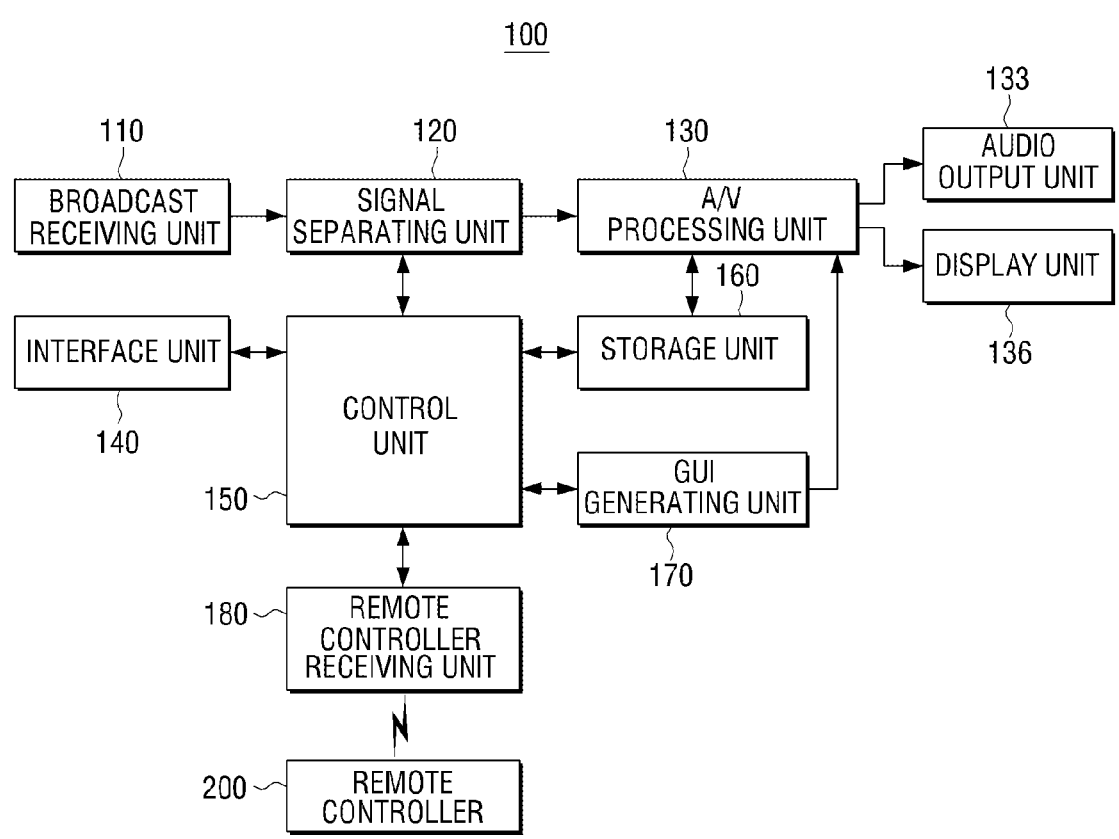
FIG. 1A is a detailed block diagram of a television (TV) according to an exemplary embodiment.

Certain exemplary embodiments of the present inventive concept will now be described in greater detail with reference to the accompanying drawings.

In the following description, same drawing reference numerals are used for the same elements even in different drawings. The matters defined in the description, such as detailed construction and elements, are provided to assist in a comprehensive understanding of the present inventive concept. Accordingly, it is apparent that the exemplary embodiments of the present inventive concept can be carried out without those specifically defined matters. Also, well-known functions or constructions are not described in detail since they would obscure the invention with unnecessary detail.

FIG. 1A illustrates a block diagram of a television (TV) 100 according to an exemplary embodiment. As illustrated in FIG. 1A, the TV 100 includes a broadcast receiver 110, a signal separator 120, an A/V processor 130, an audio output 133, a display unit 136, an interface 140, a controller 150, a storage unit 160, a graphical user interface (GUI) generator 170, and a remote receiver 180.

The broadcast receiver 110 receives wire or wireless broadcast signal from a station or a satellite and demodulates the received broadcast signal.

The signal separator 120 separates the broadcast signal into a video signal, an audio signal, and electronic program guide (EPG) information. Also, the signal separator 120 transmits video and audio signals to the A/V processor 130, and transmits EPG information to the GUI generator 170.

The A/V processor 130 decodes video, scales video, and decodes audio input from the signal separator 120 and the interface 140. Also, the A/V processor 130 outputs the video signal to the display unit 136, and outputs the audio signal to the audio output 133.

If video and audio signals are stored in the storage unit 160 or are transmitted to an external device through the interface 140, the A/V processor 130 outputs compressed video and audio signals to the storage 160 or the interface 140.

The audio output 133 outputs an audio signal generated by the A/V processor 130 to a speaker or to an external device, for example, an external speaker, connected by an external output terminal.

The display unit 136 displays the video processed by the A/V processor 130 on a screen. Also, the display unit 136 may display a menu generated by the GUI generator 170. For instance, the display unit 136 may display a menu including a plurality of pages on a part of the screen.

Specifically, the display unit 136 includes a wide screen, in which its width is longer than its height. For instance, the display unit 136 may have a 16:9 or 21:9 aspect ratio.

The display unit 136 with such aspect ratio may divide the screen into two areas and display different videos from each other in each area. Specifically, the display unit 136 may display video content at a predetermined aspect ratio in a first area.

The display unit 136 may display a menu including a plurality of pages on a second area, which is distinguished from the first area where the video content is displayed. The display unit 136 may also display content or video other than the menu in the second area.

The interface 140 connects to an external unit. For instance, the interface 140 may connect to an external image device, a camera, or a USB memory. The interface 140 may include various A/V interfaces and USB.

The storage 160 stores various content data. For instance, the storage 160 may store various contents such as movie, photo, or music.

The storage 160 records broadcast program received from the broadcast receiver 110, and stores contents. The storage 160 may store contents copied by a user in addition to stored files. Also, the storage 160 may output the stored contents to the A/V processor 130. The storage 160 may be implemented as a hard disk or a non-volatile memory.

The GUI generator 170 generates a GUI to be displayed on a screen, and adds the generated GUI to a video output from the A/V processor 130. The GUI generator 170 may generate a GUI of a menu to be displayed on the second area of the display screen.

The remote receiver 180 receives user manipulation information from a remote controller 200. Specifically, the remote receiver 180 receives information of a user touch manipulation from the remote controller 200, and transmits the touch manipulation information to the controller 150. For instance, the remote receiver 180 receives touch manipulation information of multi-direction flicks from the remote controller 200. The 'user flick touch' herein refers to dragging and handing-off from the touch area.

The remote receiver 180 receives information of a user button manipulation from the remote controller 200, and transmits the button manipulation information to the controller 150. For instance, the remote receiver 180 may receive manipulation information of multi-direction buttons from the remote controller 200.

The remote receiver 180 receives remote controller direction information from the remote controller 200. The remote controller direction information may include information on a direction to which a user holds the remote controller 200. For instance, the remote controller direction information may include direction information detected by a terrestrial magnetic sensor.

The remote controller 200 receives an input of a user manipulation, and transmits the input user manipulation to the TV 100. Specifically, the remote controller 200 includes a sensor which senses an input from a button and/or touch. If the remote controller 200 includes a direction button, the remote controller 200 receives a user direction manipulation by the direction button. If the remote controller 200 includes a touch sensor, the remote controller 200 receives a user touch manipulation by the touch sensor. The remote controller 200 transmits the detected user touch manipulation information to the remove receiver 180 of the TV 100.

A touch detector of the remote controller 200 senses the user touch manipulation by utilizing the touch sensor. The touch detector may be a touch screen of the remote controller 200 or a touch pad separately arranged on the exterior of the remote controller 200.

The remote controller 200 may include any one of touch sensor and button, or both of them.

The detailed construction of the remote controller 200 will be explained in further detail referring to FIG. 1B.

The controller 150, which includes at least one processor, analyzes a user command based on the user manipulation transmitted from the remote controller 200, and controls the TV 100 according to the analyzed user command.

Specifically, the controller 150 may divide a screen into a first area and a second area, and control the display unit 136 so that a first video is displayed on the first area and a second video is displayed on the second area.

The first area may have a longer width than a height, and the second area may have a shorter width than a height. For instance, if the TV 100 has 21:9 aspect ratio, the first area may be the left screen with 16:9 aspect ratio, and the second area may be the right area with 5:9 aspect ratio. In this example, there is no overlap in the first and second areas, and therefore, the first and second areas are completely distinguished from each other.

The controller 150 may receive remote controller direction information from the remote controller 200, and select an area to be controlled by the remote controller 200 from among the first and second areas.

Specifically, the controller 150 determines whether a longer axis of the remote controller 200 is in perpendicular or horizontal range to an yz plane, and accordingly selects the first or second areas to be controlled by the remote controller 200.

The yz plane herein refers to a plane formed by a z axis running from the display to the remote controller and a y axis running from the ground to the sky. Coordinate setting will be explained in further detail referring to FIGS. 3A to 3B.

The perpendicular range to the yz plane may correspond to a range of 45° to 90° between the longer axis of the remote controller 200 and the yz plane. The horizontal range to the yz plane may correspond to a range of 0° to 45° between the longer axis of the remote controller 200 and the yz plane. However, rather than the perpendicular or horizontal range to the yz plane is defined by specific figures, these ranges may correspond to that which is perceived to be perpendicular or horizontal by a user.

Specifically, if the longer axis of the remote controller 200 falls to the perpendicular range to the yz plane, the controller 150 selects the first area as the area to be controlled. Herein, the first area has a longer width than a height. If the longer axis of the remote controller 200 is in the horizontal range to the yz plane, the controller 150 selects the second area for controlling. Herein, the second area has a shorter width than a height.

If the remote controller 200 is placed so that the longer axis thereof faces a lateral direction, the TV 100 selects the first area having a larger width than a height as the area to be controlled by the remote controller 200. If the remote controller 200 is placed so that the shorter axis thereof faces the lateral direction, the TV 100 selects the second area having a shorter width than a height as the area to be controlled by the remote controller 200.

Accordingly, the user may select and control screen areas of the TV 100 by changing the direction of holding the remote controller 200.

Figure 1B:
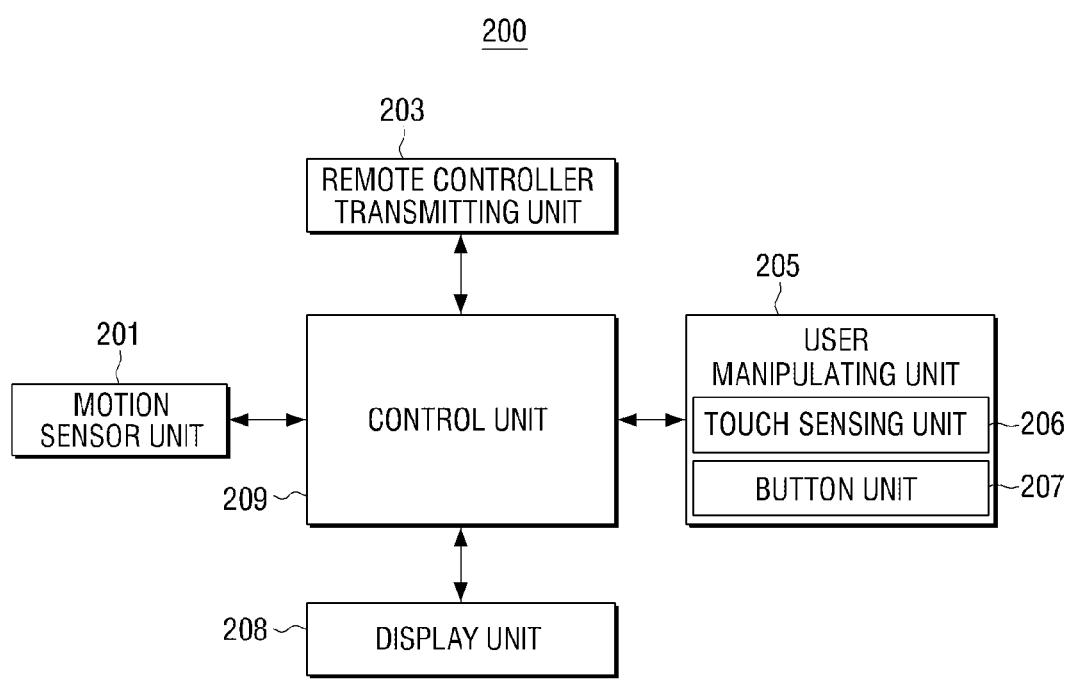
FIG. 1B is a detailed block diagram of a remote controller according to an exemplary embodiment.

FIG. 1B illustrates a detailed block diagram of the remote controller 200 according to an exemplary embodiment. Referring to FIG. 1B, the remote controller 200 may include a motion sensor 201, a remote controller transmitting unit 203, a user operating unit 205, a display 208 and a controller 209.

The motion sensor 201 detects direction information of the remote controller 20, regarding to which direction a longer axis of the remote controller 200 faces. The motion sensor 201 may detect the direction information of the remote controller by utilizing a terrestrial magnetic sensor.

The remote controller transmitting unit 203 transmits a control command inputted from the remote controller 200 and direction information of the remote controller 200 to the TV 100. Specifically, the remote controller transmitting unit 203 transmits a user manipulation input from the user operating unit 205 to the TV 100. The remote controller transmitting unit 203 also transmits the remote controller direction information detected by the motion sensor 201 to the TV 100.

The remote controller transmitting unit 203 may telecommute by utilizing IR signals or RF signals.

The user operating unit 205 receives a user manipulation. The user operating unit 205 includes a touch sensor 206 and a button unit 207. The touch sensor 206 receives a user touch manipulations. The button unit 207 receives a user button manipulation. The button unit 207 includes various buttons and also direction buttons. Although the accompanied drawings illustrate both the touch sensor 206 and the button unit 207, the user operating unit 205 may include only one of them.

The display 208 displays a screen to control the TV 100. Also, the display 208 may be provided with the touch sensor 206 and operate as a touch screen.

The controller 209, which includes at least one processor, controls the overall operations of the remote controller 200. Specifically, the controller 209 may select an area for control from among the first and second areas on a screen of the TV 100 according to the direction of the remote controller 200 detected by the motion sensor 201.

Specifically, the controller 209 may select the area for control from among the first and second areas according to whether the longer axis of the remote controller 200 is within a perpendicular or horizontal range to the yz plane.

Specifically, the controller 209 selects and controls the first area if the longer axis of the remote controller 200 falls within a perpendicular range to the yz plane. Herein, the first area has a larger width than a height. The controller 209 selects and controls the second area if the longer axis of the remote controller 200 is within a horizontal range to the yz plane. Herein, the second area has a shorter width than a height.

If the first area is selected for control, the controller 209 displays a first control screen on the display 208 of the remote controller 200. If the second area is selected for control, the controller 209 displays a second control screen on the display 208 of the remote controller 200. That is, the controller 209 controls the display 208 so that a control screen corresponding to the currently selected area among different control screens for each area is selected and displayed.

If the remote controller 200 is placed so that the longer axis thereof faces a lateral direction, the remote controller 200 controls the first area which has a larger width than a height. If the remote controller 200 is placed so that the shorter axis thereof faces the later direction, the remote controller 200 controls the second area which has a shorter width than a height.

Accordingly, a user is enabled to select and control a screen area of the TV 100 from among a first area and a second area by changing the direction of holding the remote controller 200.

Figure 2:
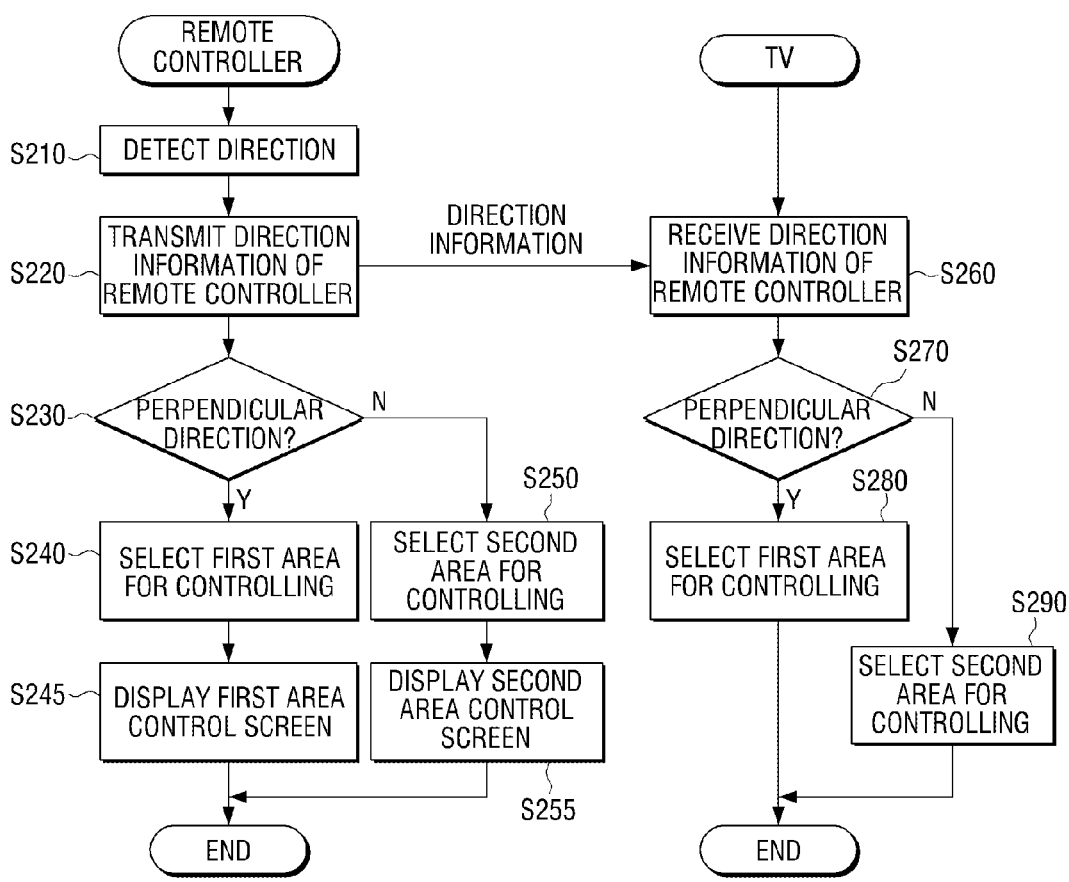
FIG. 2 is a flowchart provided to explain a method for controlling a TV and a remote controller, according to an exemplary embodiment.

Referring to FIG. 2, a control method of the TV 100 and the remote controller 200 will be explained below. FIG. 2 is a flowchart provided to explain a method for controlling a TV and a remote controller, according to an exemplary embodiment, which may be performed entirely automatically by the TV 100 and the remote controller 200.

At S210, the remote controller 200 detects a direction of the remote controller 200 through the motion sensor 201. At S220, the remote controller 200 transmits the detected remote controller direction information to the TV 100.

At S230, the remote controller 200 determines if the longer axis of the remote controller 200 is within the perpendicular range to the yz plane.

At S230-Y, if the longer axis of the remote controller 200 is within the perpendicular range to the yz plane, at S240, the remote controller 200 selects the first area from among the first and second areas as the area to be controlled. Herein, the first area has a larger width than a height. At S245, the remote controller 200 displays the first control screen on the display 208 of the remote controller 200 to control the first area displayed on the display 136 of the TV 100.

At S230-N, if the longer axis of the remote controller 200 is within the horizontal range to the yz plane, at S250, the remote controller 200 selects the second area from among the first and second areas as the area to be controlled. Herein, the second area has a shorter width than a height. At S255, the remote controller 200 displays the second control screen on the display 208 of the remote controller 200 to control the second area displayed on the display 136 of the TV 100.

At S260, the TV 100 receives the remote controller direction information from the remote controller 200.

At S270, the TV 100 determines if the longer axis of the remote controller 200 is within the perpendicular range to the yz plane by using the received remote controller direction information.

At S270-Y, if the longer axis of the remote controller 200 is within the perpendicular range to the yz plane, at S280, the TV 100 selects the first area of the display 136 to be controlled by the remote controller 200. Herein, the first area has a larger width than a height.

At S270-N, if the longer axis of the remote controller 200 is within the horizontal range to the yz plane, at S290, the TV 100 selects the second area of the display to be controlled by the remote controller 200. Herein, the second area has a shorter width than a height.

In the processes explained above, if the remote controller 200 is placed so that the longer axis thereof faces a lateral direction, the TV 100 selects the first area having a larger width than a height as the area to be controlled by the remote controller 200. If the remote controller is placed so that the shorter axis thereof faces the lateral direction, the TV 100 selects the second area having a shorter width than a height as the area to be controlled by the remote controller 200.

Accordingly, the user is enabled to control a screen area of the TV 100 by changing the direction of holding the remote controller 200.

Figure 3A:
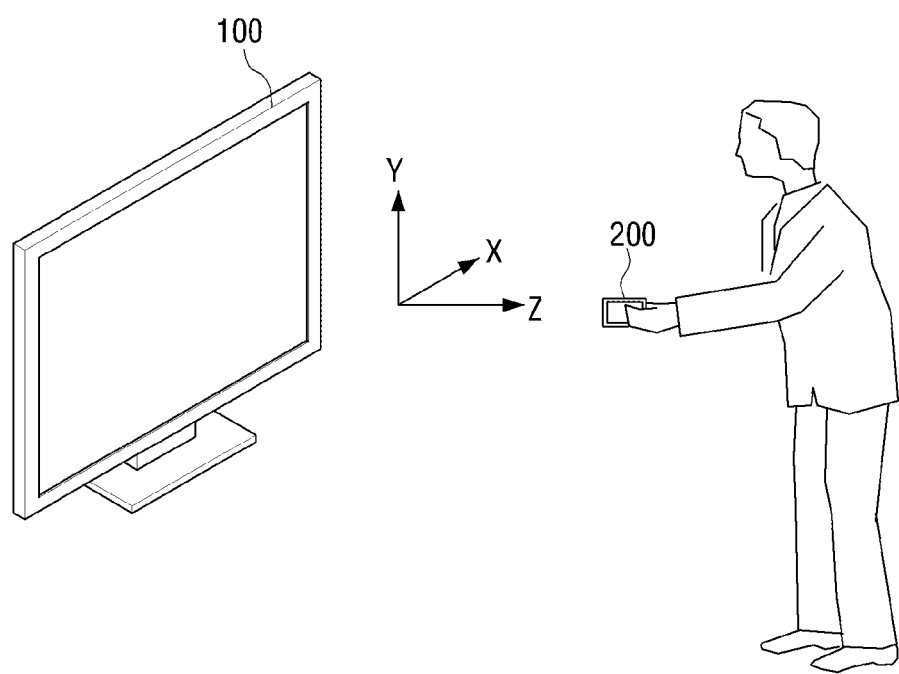
FIGS. 3A and 3B are views provided to explain definitions of directions, according to an exemplary embodiment.
Figure 3B:
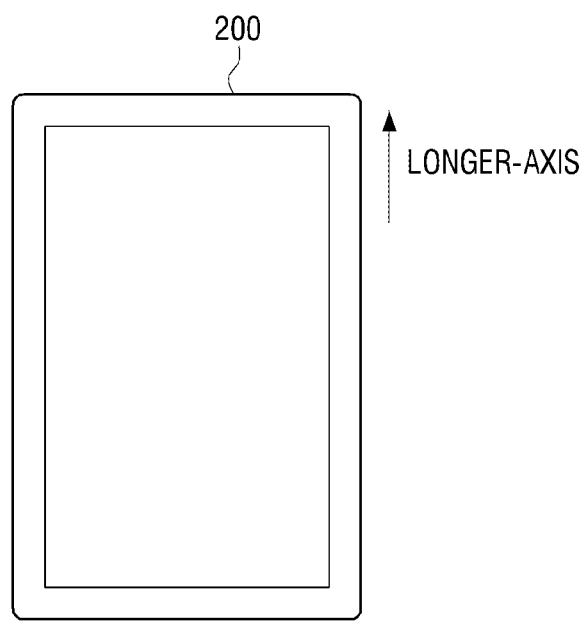

Referring to FIGS. 3A to 3B, the directions and planes used in the present disclosure according to an exemplary embodiment will be explained. FIGS. 3A to 3B are views provided to explain definitions of the directions.

FIG. 3A illustrates definitions of the x, y, and z axes. As illustrated in FIG. 3A, the z axis extends from the display of the TV 100 to the remote controller 200. The y axis extends from the ground to the sky. The yz plane is determined by y and z axes. The x axis is perpendicular to the yz plane and extends parallel to the display of the TV 100.

Referring to the definitions of the x, y, and z axes and the yz plane in FIG. 3A, the yz plane is perceived by the user as the height direction. The direction perpendicular to the yz plane is perceived by the user as the width direction.

FIG. 3B is a view provided to explain the longer axis direction. As illustrated in FIG. 3B, the longer axis direction of the remote controller 200 refers to a direction of the longer side of the remote controller 200.

The perpendicular range to the yz plane is from 45° to 90° between the longer axis of the remote controller 200 and the yz plane. The horizontal range to the yz plane includes from 0° to 45° between the longer axis of the remote controller 200 and the yz plane. The perpendicular or horizontal range to the yz plane is not necessarily limited to specific figures, since these rather refer to the ranges perceivable by the user to be perpendicular or horizontal.

Although some directions have been defined above with reference to FIGS. 3A and 3B for the purpose of illustrative convenience, it should be appreciated that the exemplary embodiments are not limited to specific terms or definitions.

Referring to FIGS. 4A to 4D, a process of controlling the TV 100 by utilizing the touch screen type remote controller 200 according to an exemplary embodiment will be explained below. FIGS. 4A to 4D illustrate a process of controlling the TV 100 by utilizing the touch screen remote controller. The remote controller 200 in FIG. 4A includes a touch screen 400.

Figure 4A:
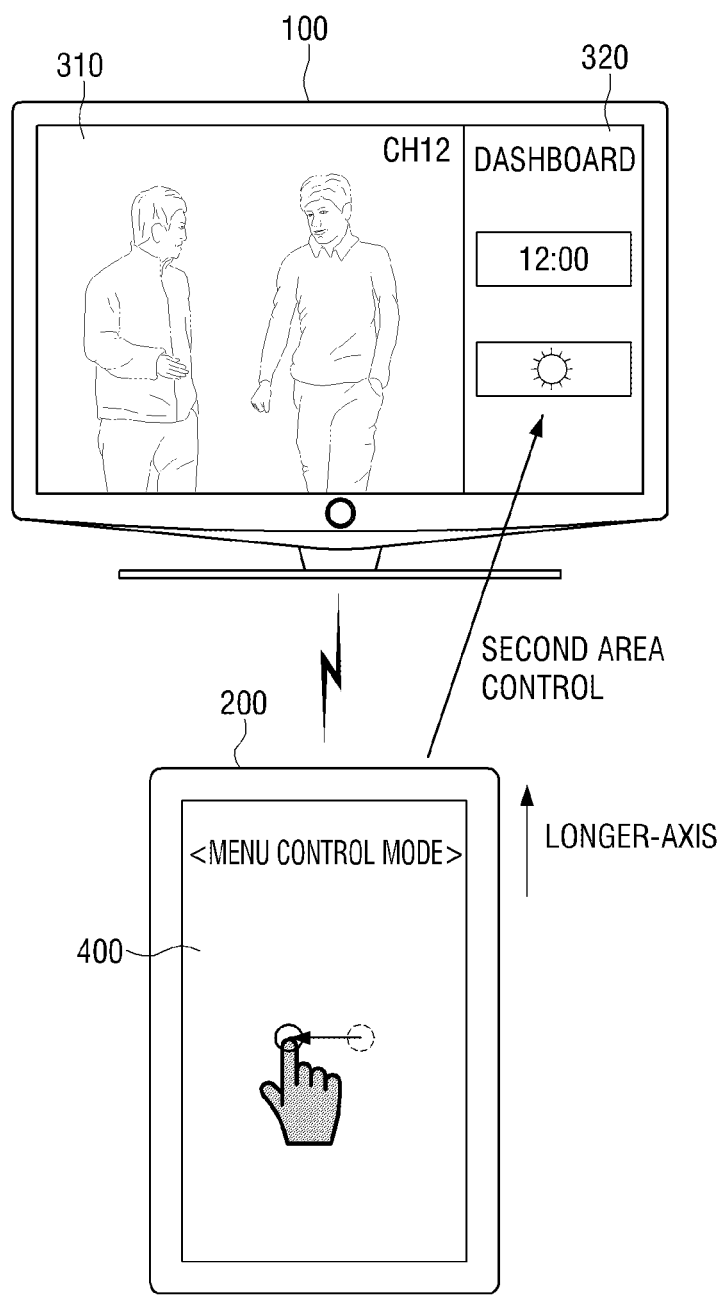
FIGS. 4A to 4D illustrate a process of controlling a TV using a touch-screen type remote controller, according to an exemplary embodiment.

FIG. 4A illustrates a screen of the TV 100 divided into the first area 310 and the second area 320. As illustrated in FIG. 4A, a channel 12 program is displayed in the first area 310 while a dashboard menu is displayed in the second area 320.

Referring to FIG. 4A, the longer axis of the remote controller 200 is positioned within the horizontal range to the yz plane. Accordingly, the touch screen 400 of the remote controller 200 displays a control screen to control the menu of the second area 320. As another example, if the longer axis of the remote controller 200 points within a range of the x-axis direction (e.g., within 45° of the x-axis direction), the longer axis of the remote controller 200 is positioned within the horizontal range to the yz plane, and the remote controller 200 is set to control the second area 320.

Figure 4B:
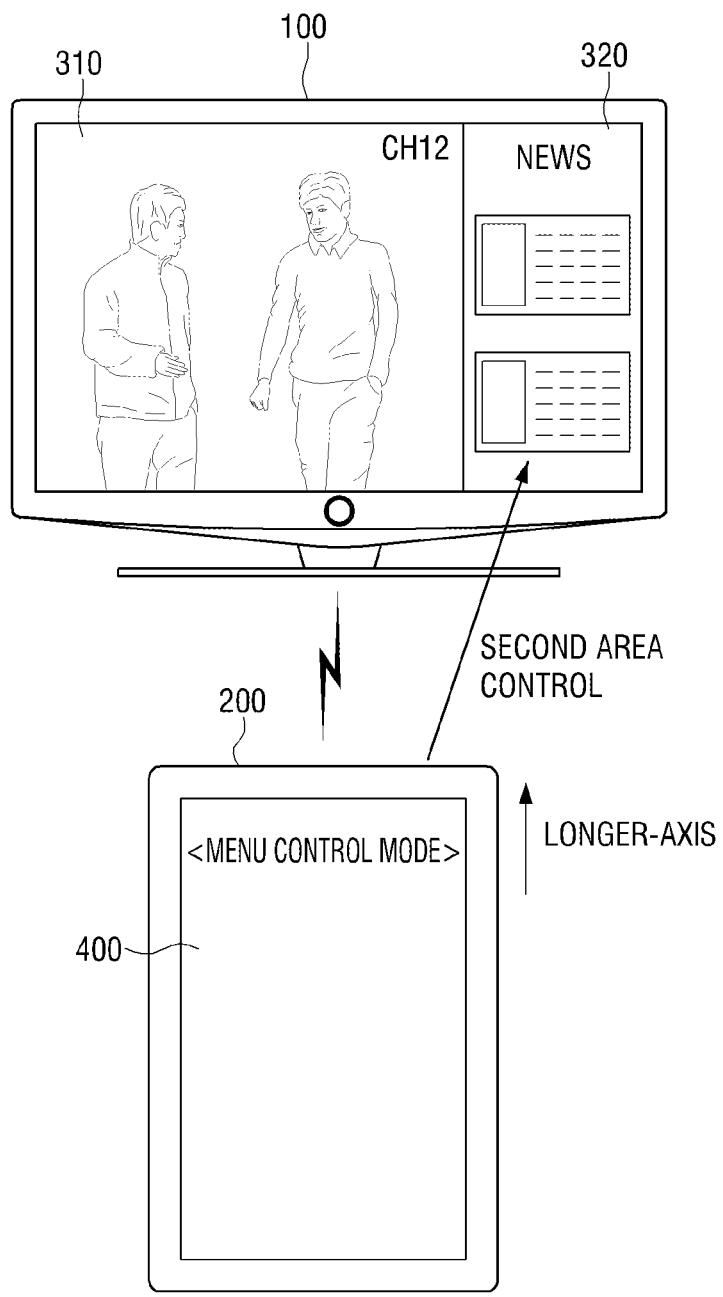

If a user inputs a left-flick touch manipulation on the touch screen 400 in the state as illustrated in FIG. 4A, the TV 100 changes the menu of the second area 320 to the next news page as illustrated in FIG. 4B.

Therefore, if the remote controller 200 is placed so that the shorter axis thereof points in the lateral direction (i.e., a shorter side of the remote controller 200 faces towards the TV 100), the remote controller 200 controls the second area 320, which has a longer height than a width, of the TV 100.

Figure 4C:
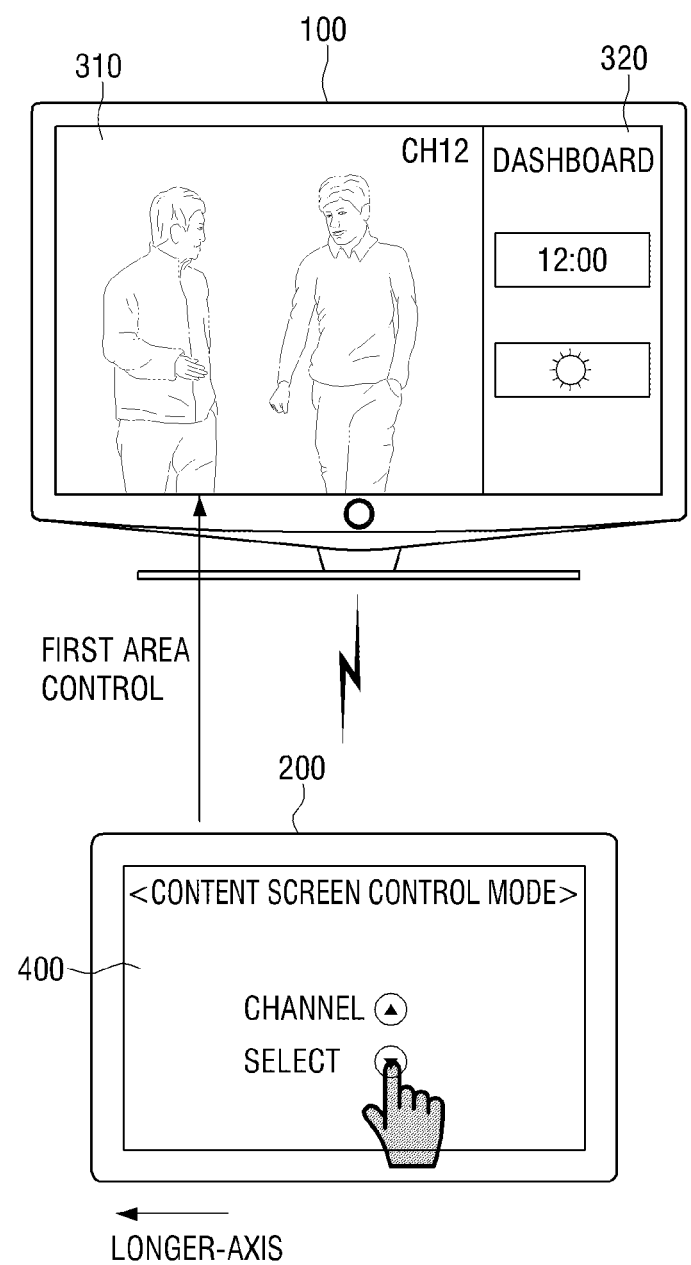

Referring to FIG. 4C, the longer axis of the remote controller 200 is within the perpendicular range to the yz plane. Accordingly, the touch screen 400 of the remote controller 200 displays a control screen to control the first area 310 (i.e., to change the broadcast channels of the content displayed on the first area 310). As another example, if the longer axis of the remote controller 200 points within a range of the z-axis direction (e.g., within 45° of the z-axis direction), the longer axis of the remote controller 200 is positioned within the perpendicular range to the yz plane, and the remote controller 200 is set to control the first area 310.

Figure 4D:
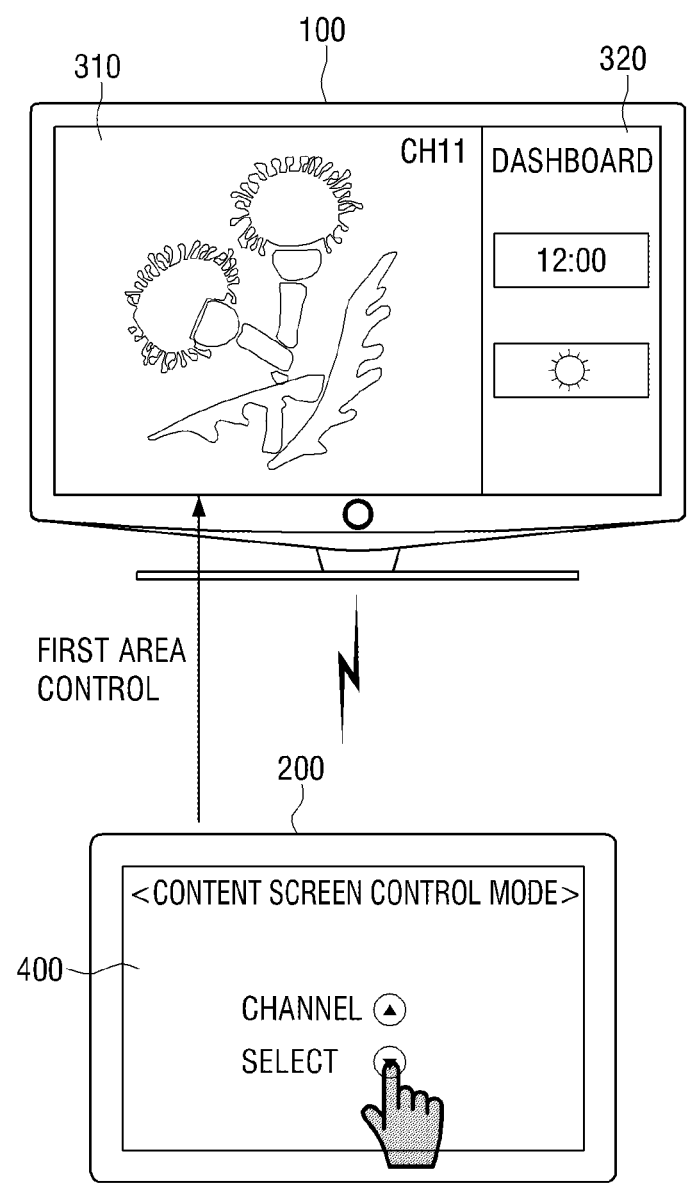

In such a state, if a user selects an icon for changing channels displayed on the touch screen 400 as illustrated in FIG. 4C, the TV 100 changes a broadcast channel of the content displayed on the first area 310 to the previous channel, i.e., CH 11, as illustrated in FIG. 4D.

As explained above, if the remote controller 200 is placed so that the longer axis thereof points in the lateral direction (i.e., the longer side of the remote controller 200 faces towards the TV 100), the remote controller 200 controls the first area 310, which has a longer width than a height, of the TV 100.

Since the remote controller 200 controls the first area 310 having a larger width than a height when placed so that the longer axis thereof points in the lateral direction, and controls the second area 320 having a larger height than a width when placed so that the shorter axis thereof points in the lateral direction, the user can intuitively find a screen area to be controlled.

Figure 5A:
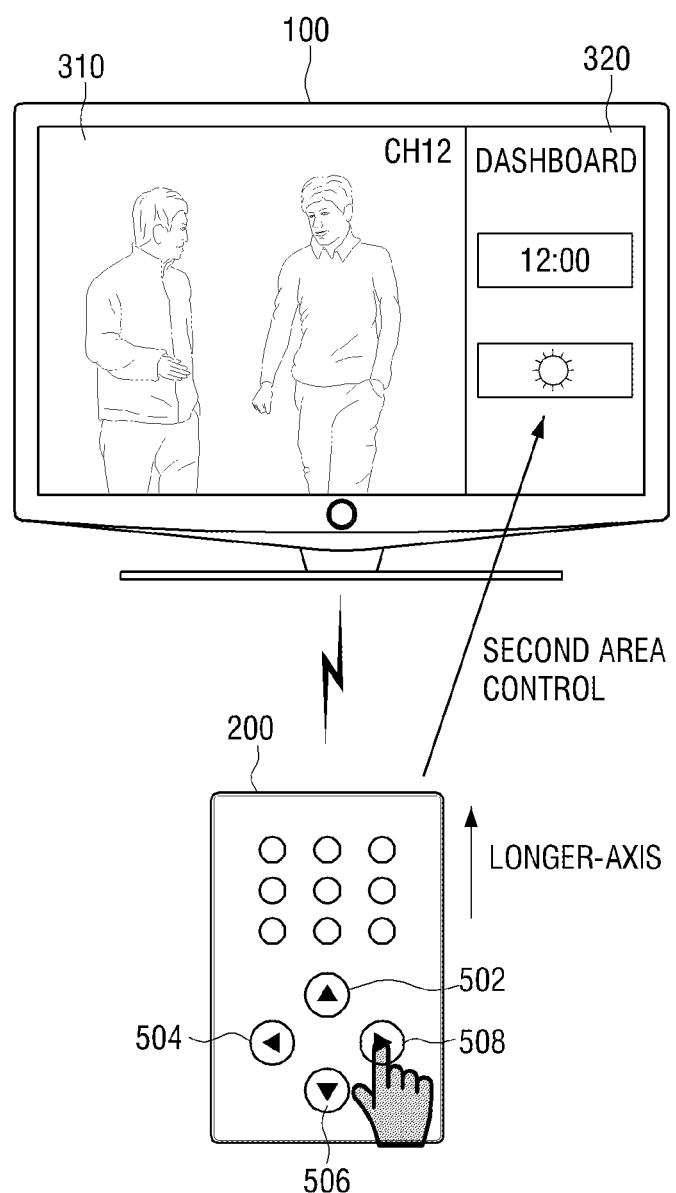
FIGS. 5A to 5D are views provided to explain a process of controlling a TV using a button-type remote controller, according to an exemplary embodiment.

Referring to FIGS. 5A to 5D, a process of controlling the TV by utilizing a button-type remote controller according to an exemplary embodiment will be explained below. FIGS. 5A to 5D are views provided to explain a process of controlling a TV using a button-type remote controller, according to an exemplary embodiment. Referring to FIG. 5A, the remote controller 200 includes direction buttons 502, 504, 506, 508.

FIG. 5A illustrates a screen of the TV 100 divided into the first area 310 and the second area 320. As illustrated in FIG. 5A, CH 12 broadcast program is displayed in the first area 310 while a dashboard menu is displayed in the second area 320.

Referring to FIG. 5A, the longer axis of the remote controller 200 is within the horizontal range to the yz plane. Accordingly, the direction buttons 502, 504, 506, 508 of the remote controller 200 are used to control the screen displayed in the second area 320.

Figure 5B:
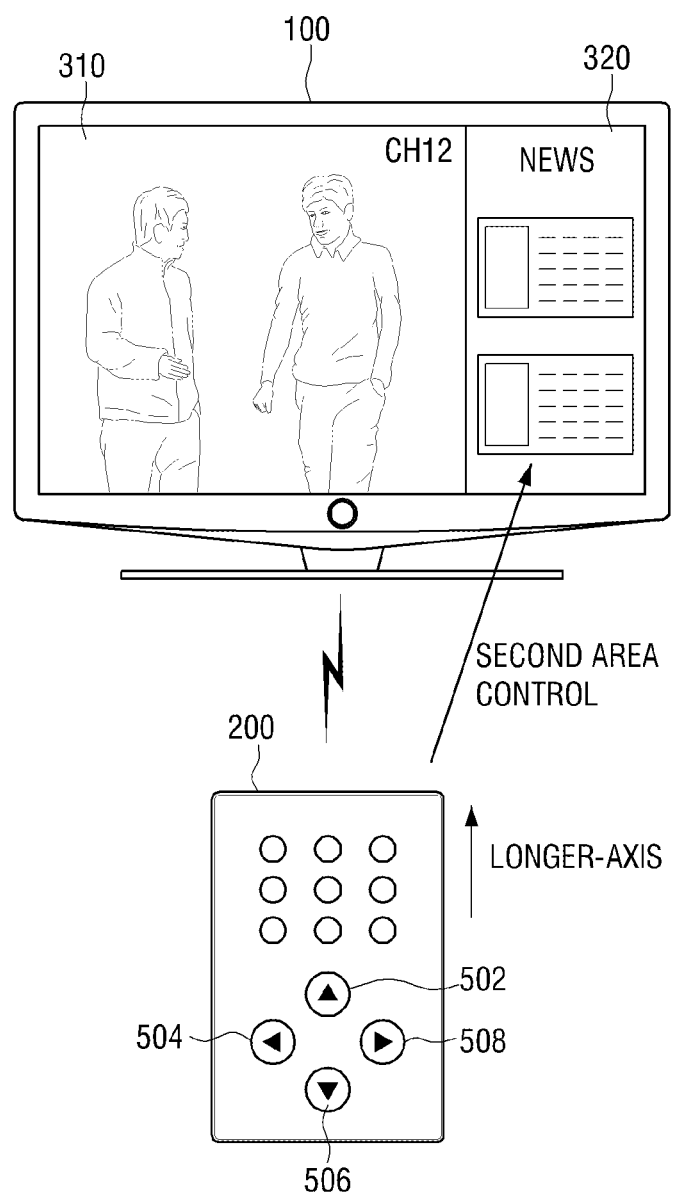

In such a state, if a user inputs right-direction button 508 manipulation as illustrated in FIG. 5A, the TV 100 changes the menu in the second area 320 to the next menu page (e.g., news page) of a plurality of menu pages as illustrated in FIG. 5B.

Accordingly, if the remote controller 200 is placed so that the shorter axis thereof faces the lateral direction, the remote controller 200 controls the second area 320 which has a larger height than a width of the TV 100.

Figure 5C:
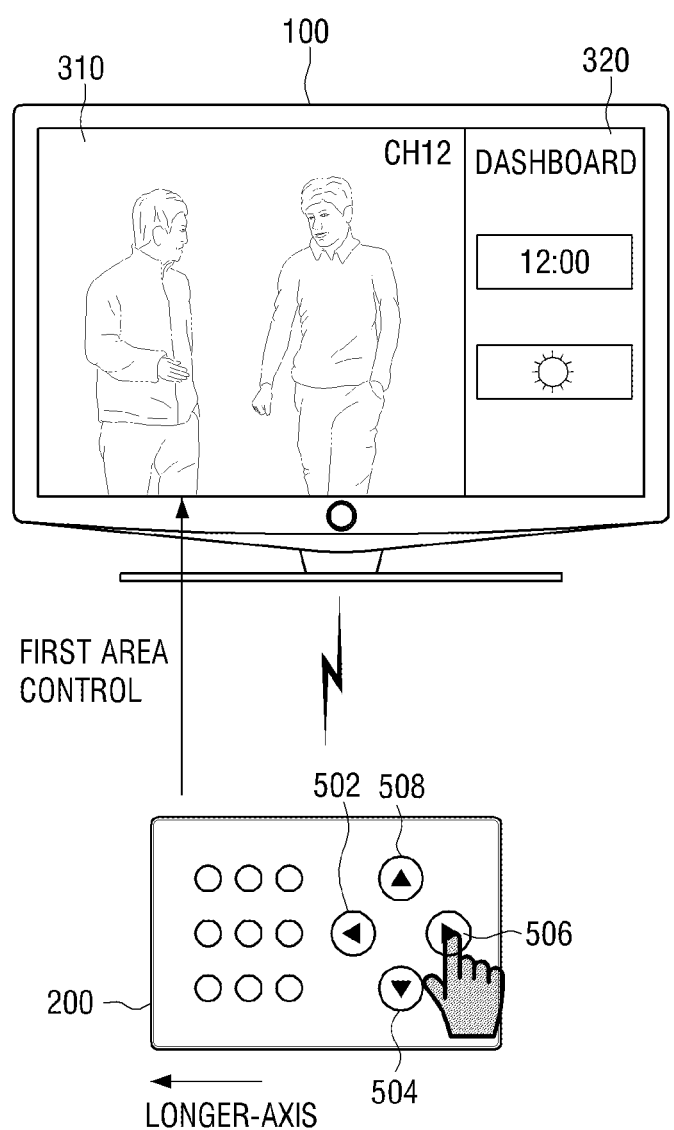

Referring to FIG. 5C, the longer axis of the remote controller 200 is within the perpendicular range to the yz plane. Accordingly, the direction buttons 502, 504, 506, 508 of the remote controller 200 are used to control the screen of the first area 310. The direction buttons 502, 504, 506, 508 may have different functions when the remote controller 200 is in this orientation from those functions performed by direction buttons 502, 504, 506, 508 when the remote controller 200 is oriented as illustrated in FIG. 5A. This is so that the buttons 502, 504, 506, 508 perform functions which correspond to the specific area of the screen that is being controlled.

Figure 5D:
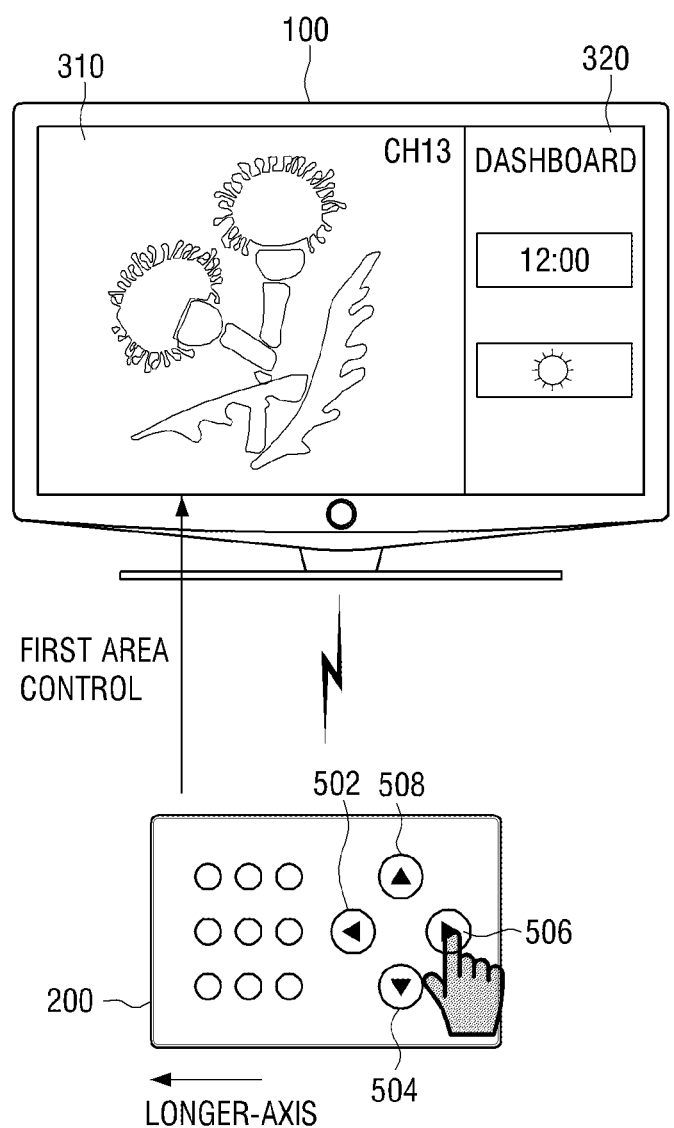

In this situation, if a user inputs down-direction button 506 manipulation as illustrated in FIG. 5C, the TV 100 changes the channel of the broadcast screen displayed in the first area 310 to the next channel, i.e., CH 13 as illustrated in FIG. 5D.

As explained above, the remote controller 200 controls the first area 310 having a larger width than a height of the TV 100 when the remote controller 200 is placed so that the longer axis thereof points in the lateral direction.

Since the remote controller 200 controls the first area 310 having a larger width than a height when placed so that the longer axis thereof points in lateral direction, and controls the second area 320 having a larger height than a width when placed so that the shorter axis thereof points in the lateral direction, the user can intuitively find a screen area to be controlled.

Figure 6:
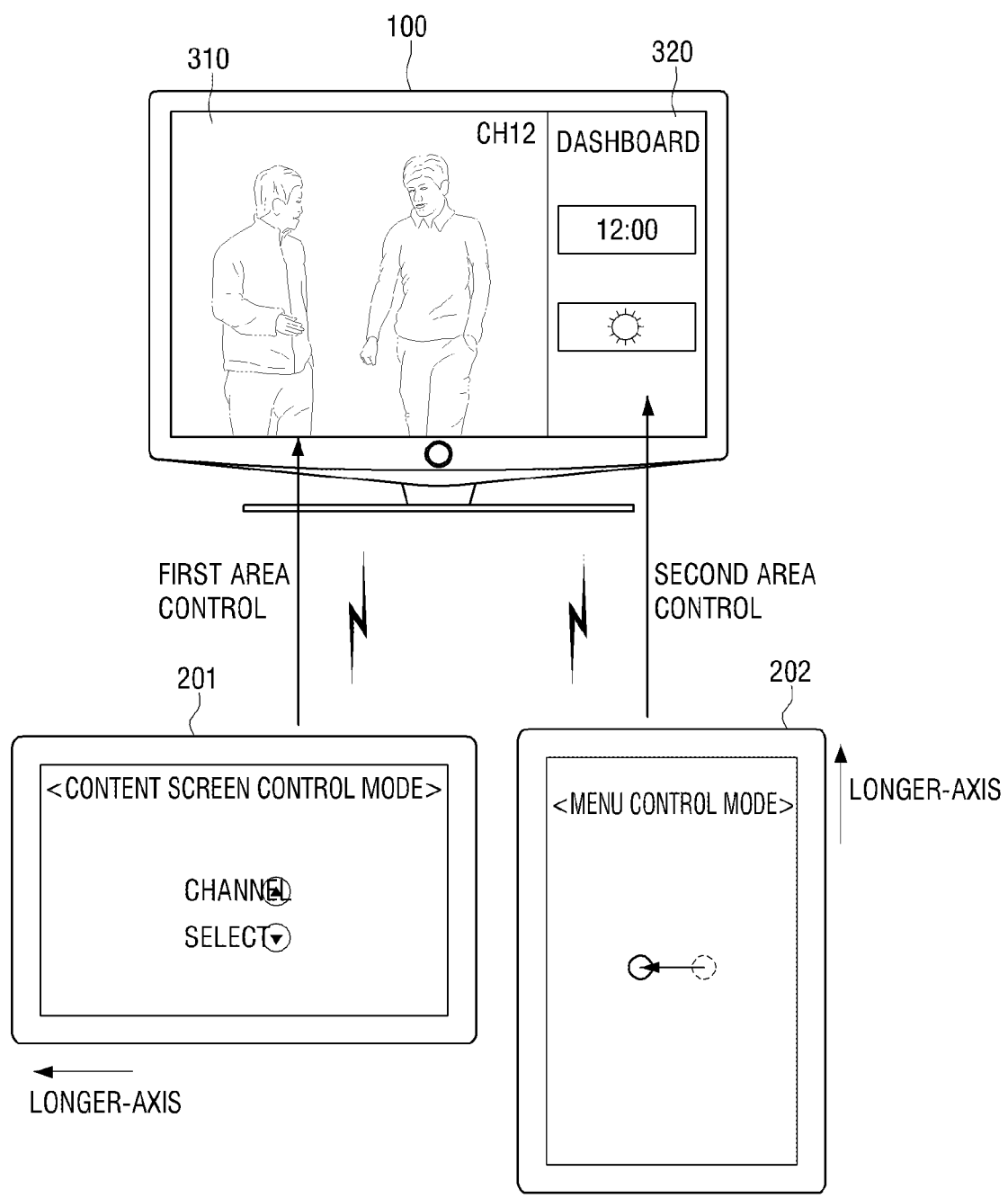
FIG. 6 illustrates controlling of a TV using two remote controllers, according to an exemplary embodiment.

FIG. 6 illustrates an example of controlling the TV using two remote controllers according to an exemplary embodiment. Referring to FIG. 6, the TV 100 is controlled by two remote controllers 201, 202. The longer axis of the first remote controller 201 is within a perpendicular range to the yz plane, while the second remote controller 202 is within a horizontal range to the yz plane.

Accordingly, the first remote controller 201 is used to control the screen displayed in the first area 310, and the second remote controller 202 is used to control the screen displayed in the second area 320.

If a user has two remote controllers as in the example explained above, the TV 100 may be controlled by the two remote controllers, in which case the areas to be controlled are changeable depending on the direction of the remote controllers.

Although the above exemplary embodiments are explained using the TV as a display, any other display devices having an aspect ratio that can be divided into the first and second areas may also be implemented. For instance, the display devices such as a mobile phones, portable media player (PMP), and MP3 player may be applied within the technical scope of the exemplary embodiments.

In addition, the remote controller 200 may be any one of devices that can control the TV 100. For instance, a mobile phone including a remote control function may be used.

The foregoing exemplary embodiments and advantages are merely exemplary and are not to be construed as limiting the present invention. The present teaching can be readily applied to other types of apparatuses. Also, the description of the exemplary embodiments of the present inventive concept is intended to be illustrative, and not to limit the scope of the claims, and many alternatives, modifications, and variations will be apparent to those skilled in the art.

What is claimed is:

1. A display apparatus, comprising:
    a display unit which displays a first image on a first area of a screen, and displays a second image on a second area of the screen; and
    a control unit, configured with program logic, to perform:
    receiving direction information regarding an orientation of a remote controller from the remote controller that has been sensed by the remote controller, wherein the remote controller includes a longer-axis and a shorter-axis, and the direction information indicates an axis of the remote controller which is perpendicular to the display unit from among the longer-axis and the shorter-axis of the remote controller, and
    selecting an area to be controlled by the remote controller from among the first and the second areas according to whether a direction of a longer side of the first or second area corresponds to a direction of the longer-axis indicated by the direction information received from the remote controller,
    wherein an aspect ratio of the first area is longer in a horizontal direction than in a vertical direction, and an aspect ratio of the second area is shorter in the horizontal direction than in a vertical direction, and
    wherein the selecting selects the first area when the shorter-axis of the remote controller is perpendicular to the display unit, and selects the second area when the longer-axis of the remote controller is perpendicular to the display unit.

2. The display apparatus of claim 1, wherein the control unit receives command information transmitted from the remote controller, which is different from the direction information transmitted from the remote controller, wherein the command information corresponds to a user manipulation input from a user operating unit of the remote controller.

3. A method for controlling a display apparatus using a remote controller, the method comprising:
    displaying a first image on a first area of a screen of the display apparatus, and displaying a second image on a second area of the screen of the display apparatus;
    receiving direction information regarding an orientation of the remote controller from the remote controller that has been sensed by the remote controller, wherein the remote controller includes a longer-axis and a shorter-axis, and the direction information indicates an axis of the remote controller which is perpendicular to the display unit from among the longer-axis and the shorter-axis of the remote controller; and
    selecting an area for controlling by the remote controller, from among the first and the second areas, according to whether a direction of a longer side of the first or second area corresponds to a direction of the longer-axis indicated by the direction information received from the remote controller,
    wherein an aspect ratio of the first area is longer in a horizontal direction than in a vertical direction, and an aspect ratio of the second area is shorter in the horizontal direction than in a vertical direction, and
    wherein the selecting selects the first area when the shorter-axis of the remote controller is perpendicular to the display unit, and selects the second area when the longer-axis of the remote controller is perpendicular to the display unit.

4. A remote controller for controlling a display apparatus, comprising:
    a motion sensor unit which detects direction information of the remote controller, the direction information including which one of a longer-axis and a shorter-axis of the remote controller is perpendicular to the display apparatus;
    a transmitting unit which transmits the direction information to the display apparatus;
    a control unit, configured with program logic, to perform:
    selecting an area to be controlled from among a first area and a second area of a screen of the display apparatus according to whether a direction of a longer side of the first or second area corresponds to a direction of the longer-axis indicated by the detected direction information of the remote controller; and a display unit which displays a control screen on the remote controller to control the display apparatus, wherein the remote controller displays a first control screen to control the first area on the display unit upon selecting of the first area for controlling, and displays a second control screen to control the second area upon selecting of the second area for controlling, wherein the first control screen and the second control screen are different from each other, wherein an aspect ratio of the first area is longer in a horizontal direction than in a vertical direction, and an aspect ratio of the second area is shorter in the horizontal direction than in a vertical direction, and wherein the selecting selects the first area when the shorter-axis of the remote controller is perpendicular to the display unit, and selects the second area when the longer-axis of the remote controller is perpendicular to the display unit.

5. A control method of a remote controller, having a display unit configured to display a first control screen and a second control screen, for controlling a display apparatus, comprising:

detecting, by the remote controller, direction information that indicates an axis of the remote controller which is perpendicular to the display apparatus from among a longer-axis and a shorter-axis of the remote controller;

transmitting, by the remote controller, the detected direction information to the display apparatus; and selecting an area to be controlled from among a first area and a second area of a screen of the display apparatus according to whether a direction of a longer side of the first or second area corresponds to a direction of the longer-axis indicated by the detected direction information of the remote controller; and displaying the first control screen on the display unit of the remote controller to control the first area upon selecting of the first area for controlling, and displaying the second control screen on the display unit of the remote controller to control the second area upon selecting of the second area for controlling, wherein the first control screen and the second control screen are different from each other, wherein an aspect ratio of the first area is longer in a horizontal direction than in a vertical direction, and an aspect ratio of the second area is shorter in the horizontal direction than in a vertical direction, and wherein the selecting selects the first area when the shorter-axis of the remote controller is perpendicular to the display unit, and selects the second area when the longer-axis of the remote controller is perpendicular to the display unit.

6. A display apparatus controlled by a first remote controller and a second remote controller, wherein each of the first remote controller and the second remote controller includes a longer-axis and a shorter-axis, the display apparatus comprising:

a display unit which displays a first image on a first area of a screen, and displays a second image on a second area of the screen; and a control unit configured with program logic to perform:

receiving first direction information regarding an orientation of the first remote controller from the first remote controller that has been sensed by the first remote controller, wherein the first direction information indicates an axis of the first remote controller which is perpendicular to the display unit from among the longer-axis and the shorter-axis of the first remote controller, receiving second direction information regarding an orientation of the second remote controller from the second remote controller that has been sensed by the second remote controller, wherein the second direction information indicates an axis of the second remote controller which is perpendicular to the display unit from among the longer-axis and the shorter-axis of the second remote controller, and selecting areas to be controlled by the first and second remote controllers from among the first and the second areas according to whether a direction of a longer side of the first or second area corresponds to a direction of the longer-axis indicated by the first or second direction information received from the first and second remote controllers, wherein an aspect ratio of the first area is longer in a horizontal direction than in a vertical direction, and an aspect ratio of the second area is shorter in the horizontal direction than in a vertical direction, and wherein the selecting selects the first area when the shorter-axis of the remote controller is perpendicular to the display unit, and selects the second area when the longer-axis of the remote controller is perpendicular to the display unit.

7. A display apparatus, comprising:

a display unit which displays a first image on a first area of a screen, and displays a second image on a second area of the screen; and a control unit, configured with program logic, to perform:

receiving direction information regarding an orientation of a remote controller from the remote controller that has been sensed by the remote controller, and wherein the remote controller comprises a first axis and a second axis which is perpendicular to the first axis, and the direction information indicates an axis of the remote controller which is perpendicular to the display unit from among the first axis and the second axis of the remote controller, and selecting an area to be controlled by the remote controller from among the first and the second areas according to whether a direction of a longer side of the first or second area corresponds to the direction information received from the remote controller, the control unit selects the area to be controlled by the remote controller from among the first and the second areas, depending on whether a longer axis from the first axis and the second axis of the remote controller points in a direction that is within a predetermined range of a z-axis of the display apparatus, wherein the z-axis is perpendicular to the screen of the display apparatus, wherein, if the control unit detects from the direction information that the first axis of the remote controller points in the direction that is within the predetermined range of the z-axis of the display apparatus, the control unit selects the first area among the first and the second areas to be controlled by the remote controller, and if the control unit detects from the direction information that the second axis of the remote controller points in the direction that is within the predetermined range of the z-axis of the display apparatus, the control unit selects the second area among the first and the second areas to be controlled by the remote controller.

8. The display apparatus of claim 7, wherein the predetermined range extends 45° from both sides of the z-axis in a lateral direction.

* * * * *